(12) United States Patent
Jamart

(10) Patent No.: US 12,420,529 B2
(45) Date of Patent: Sep. 23, 2025

(54) LAMINATED GLAZING

(71) Applicant: SAINT-GOBAIN GLASS FRANCE, Courbevoie (FR)

(72) Inventor: Juliette Jamart, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 361 days.

(21) Appl. No.: 17/926,851

(22) PCT Filed: Jun. 16, 2021

(86) PCT No.: PCT/FR2021/051078
§ 371 (c)(1),
(2) Date: Nov. 21, 2022

(87) PCT Pub. No.: WO2021/255385
PCT Pub. Date: Dec. 23, 2021

(65) Prior Publication Data
US 2023/0191753 A1     Jun. 22, 2023

(30) Foreign Application Priority Data
Jun. 16, 2020  (FR) .................................. 2006251

(51) Int. Cl.
*B32B 15/04*     (2006.01)
*B32B 7/12*      (2006.01)
(Continued)

(52) U.S. Cl.
CPC .......... *B32B 17/10073* (2013.01); *B32B 7/12* (2013.01); *B32B 17/10275* (2013.01);
(Continued)

(58) Field of Classification Search
CPC ................................................. B32B 17/10036
(Continued)

(56) References Cited

U.S. PATENT DOCUMENTS 5,510,188 A * 4/1996 Vockler ............. C04B 35/62222
                                                          428/428
5,518,535 A * 5/1996 Boaz ......................... C03C 8/14
                                                          106/431
(Continued)

FOREIGN PATENT DOCUMENTS

DE   20 2018 105625 U1    10/2018
EP       2 883 694 A1      6/2015
(Continued)

OTHER PUBLICATIONS

International Search Report as issued in International Patent Application No. PCT/FR2021/051078, dated Sep. 21, 2021.

*Primary Examiner* — Lauren R Colgan
(74) *Attorney, Agent, or Firm* — Pillsbury Winthrop Shaw Pittman LLP

(57) ABSTRACT

A bent laminated glazing, in particular for a motor vehicle windscreen, includes a first glass sheet adhesively bonded to a second glass sheet by a lamination interlayer, the first glass sheet including a face, referred to as face 2, facing the lamination interlayer, and the second glass sheet including a face, referred to as face 4, opposite the lamination interlayer, wherein the face 2 includes a region, referred to as first region, coated with a layer of opaque mineral paint obtained from an aqueous paint composition including pigments and an aqueous solution of alkali metal silicate, and the face 4 includes a region, referred to as second region, coated with an enamel coating.

22 Claims, 1 Drawing Sheet

(51) Int. Cl.
B32B 17/06 (2006.01)
B32B 17/10 (2006.01)
B32B 38/00 (2006.01)

(52) U.S. Cl.
CPC .. *B32B 38/0036* (2013.01); *B32B 2038/0076* (2013.01); *B32B 2250/02* (2013.01); *B32B 2307/41* (2013.01); *B32B 2605/006* (2013.01); *B32B 2605/08* (2013.01)

(58) Field of Classification Search
USPC .................................................. 428/426, 428
See application file for complete search history.

(56) References Cited

U.S. PATENT DOCUMENTS

| | | | | |
|---|---|---|---|---|
| 5,660,893 | A * | 8/1997 | Boaz | C03C 8/14 427/398.1 |
| 5,677,064 | A * | 10/1997 | Boaz | C03C 17/007 428/404 |
| 5,759,220 | A * | 6/1998 | Boaz | B32B 17/10889 65/102 |
| 6,126,737 | A * | 10/2000 | Mason | C03C 17/04 106/431 |
| 6,176,919 | B1 * | 1/2001 | Mason | C09D 1/02 106/431 |
| 6,495,261 | B1 * | 12/2002 | Gagliardi | B32B 17/10036 296/84.1 |
| 10,449,837 | B2 * | 10/2019 | Legrand | B32B 17/10651 |
| 10,882,780 | B2 * | 1/2021 | Conti | B32B 17/10128 |
| 11,826,987 | B2 * | 11/2023 | Voss | B32B 17/10633 |
| 11,865,812 | B2 * | 1/2024 | Jamart | B32B 17/10348 |
| 12,091,354 | B2 * | 9/2024 | Jamart | C03C 17/008 |
| 2006/0260734 | A1 * | 11/2006 | Brown | B32B 17/10266 428/210 |
| 2014/0272338 | A1 * | 9/2014 | Vandal | C03C 17/008 427/163.1 |
| 2016/0075111 | A1 * | 3/2016 | Dixon | B32B 37/12 428/192 |
| 2016/0340232 | A1 * | 11/2016 | Mitra | C03C 3/093 |
| 2017/0190151 | A1 * | 7/2017 | Hamano | B32B 17/10788 |
| 2017/0361576 | A1 * | 12/2017 | Legrand | B32B 17/10788 |
| 2018/0098386 | A1 * | 4/2018 | Masschelein | B32B 17/10192 |
| 2018/0305245 | A1 * | 10/2018 | Conti | B32B 17/10036 |
| 2020/0254731 | A1 * | 8/2020 | Mannheim Astete | B32B 17/1077 |
| 2020/0276792 | A1 * | 9/2020 | Laluet | B32B 17/10174 |
| 2020/0290318 | A1 * | 9/2020 | Mannheim Astete | B32B 17/1077 |
| 2020/0290319 | A1 * | 9/2020 | Mannheim Astete | B32B 27/306 |
| 2020/0391577 | A1 * | 12/2020 | Bard | B32B 17/10889 |
| 2020/0398536 | A1 * | 12/2020 | Wohlfeil | B32B 17/10146 |
| 2021/0237540 | A1 * | 8/2021 | Kojima | B32B 17/10293 |
| 2022/0055350 | A1 * | 2/2022 | Jamart | C03C 17/007 |
| 2022/0176681 | A1 * | 6/2022 | Voss | B32B 17/10633 |
| 2023/0399257 | A1 * | 12/2023 | Flamary-Mespoulie | C03C 17/3655 |

FOREIGN PATENT DOCUMENTS

| | | |
|---|---|---|
| WO | WO 2014/093568 A1 | 6/2014 |
| WO | WO 2017/187054 A1 | 11/2017 |
| WO | WO 2019/064275 A2 | 4/2019 |
| WO | WO 2019/147605 A1 | 8/2019 |

* cited by examiner

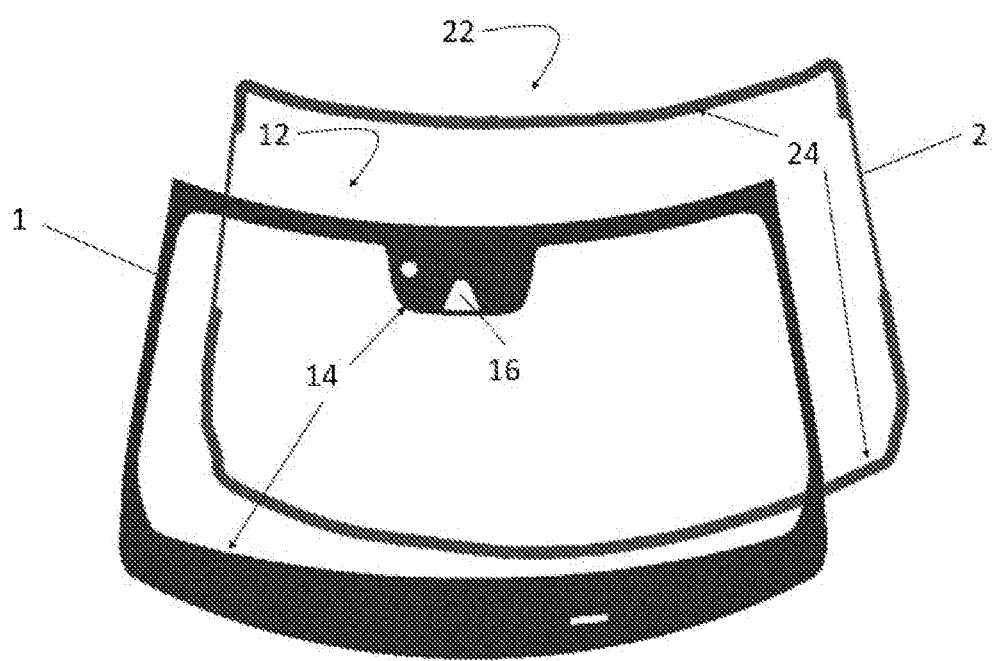

LAMINATED GLAZING

CROSS-REFERENCE TO RELATED APPLICATIONS

This application is the U.S. National Stage of PCT/FR2021/051078, filed Jun. 16, 2021, which in turn claims priority to French patent application number 2006251 filed Jun. 16, 2020. The content of these applications are incorporated herein by reference in their entireties.

The invention relates to the field of laminated glazings, in particular glazings for motor vehicles, such as glazings for windscreens or roofs of motor vehicles.

Laminated glazings are glazings comprising two glass sheets adhesively bonded to one another by a thermoplastic interlayer. The latter makes it possible in particular to retain shards of glass in the event of breakage, but also provides other functions, in particular in terms of resistance to breaking and entering or improving acoustic properties. Such glazings are used in particular as windscreens in motor vehicles, and are therefore bent. The glass sheet arranged on the convex side, referred to as the external sheet since it is intended to be positioned outside the vehicle, comprises a face conventionally referred to as "face 1" (outside the vehicle) and a face 2 in contact with the lamination interlayer, and the glass sheet arranged on the concave side, referred to as the internal sheet, comprises a face 3 in contact with the lamination interlayer and a face 4, opposite the lamination interlayer, and intended to be positioned inside the vehicle.

These laminated glazings generally comprise enamel coatings which make it possible for example to conceal the assembly seals of the glazing in a window opening of a vehicle body and also to protect them from ultraviolet radiation. The enamel coating, often arranged on face 2 or on face 4, is generally in the form of a strip arranged at the periphery of the glass sheet.

Enamel coating is intended to mean a coating obtained by depositing and curing an enamel composition, which comprises a glass frit and pigments, often black pigments. The enamel coating is generally deposited by screen printing and is subsequently cured during the bending, which subjects the glass sheets to temperatures of at least 550° C., or even of at least 600° C. This treatment is carried out in heating devices such as furnaces, in which the glass sheets are heated by convection and radiation.

It has been observed that bent laminated glazings had, in certain cases, optical distortions, sometimes referred to as "burn lines", in the vicinity of the enameled region.

These distortions are particularly bothersome when they are located close to the regions, referred to as "camera regions", through which optical sensors must capture light or images. This is the case for example for windscreens provided with sensors and/or cameras, for example rain or light sensors or driving assistance cameras. These sensors or cameras are located inside the vehicle, against face 4 of the glazing, for example in the region in which the interior rear-view mirror is attached to the windscreen. An enamel coating is generally arranged in this region in order to conceal and protect the adhesive which serves to attach the interior rear-view mirror, but this enameled region must leave a small non-enameled transmission window so that light can reach the sensors. It is important for this camera region to be devoid of optical distortions in order to prevent the captured image from being deformed and, where appropriate, incorrectly analyzed.

It has become apparent that such distortions were due to the fact that the enamel, in particular when it is black, strongly absorbs infrared radiation, more than naked glass. Consequently, during bending, there are large temperature differences between on the one hand the regions coated with the enamel (enameled regions) and on the other hand the regions of glass not coated with the enamel (non-enameled regions), with these temperature differences being the cause of the distortions observed.

The glazing is generally attached to the window opening of the body by means of an adhesive seal arranged in the form of a bead at the periphery of the glazing. It is important for this bonding to be durable, and therefore for the mechanical strength, chemical resistance and resistance to aging to be as good as possible. Generally, including in regions where the enamel coating is not in contact with the adhesive seal, and therefore forms a decoration which is visible from the interior of the vehicle, it is important for the enamel to be chemically resistant in order to avoid any visible alteration to the decoration over time.

The aim of the invention is to respond to these different problems.

To this end, the subject of the invention is a bent laminated glazing, in particular for a windscreen, comprising a first glass sheet adhesively bonded to a second glass sheet by means of a lamination interlayer, said first glass sheet comprising a face, referred to as face 2, facing said lamination interlayer, and said second glass sheet comprising a face, referred to as face 4, opposite said lamination interlayer, wherein said face 2 comprises a region, referred to as first region, coated with a layer of opaque mineral paint obtained from an aqueous paint composition comprising pigments and an aqueous solution of alkali metal silicate, and said face 4 comprises a region, referred to as second region, coated with an enamel coating.

Another subject of the invention is a method for obtaining a laminated glazing according to the invention, comprising the following steps:

a step of depositing on a region, referred to as first region, of a face, referred to as face 2, of a first glass sheet, an aqueous paint composition comprising pigments and an aqueous solution of alkali metal silicate, then a step of pre-curing at a temperature of at least 200° C., so as to obtain a layer of mineral paint, a step of depositing on a region, referred to as second region, of a face, referred to as face 4, of a second sheet of glass, an enamel coating, then a step of bending, in particular simultaneously bending, the first and second glass sheet, then a step of laminating the first and the second glass sheet by means of a lamination interlayer, such that said face 2 is facing said interlayer and said face 4 is opposite said interlayer.

The glass sheets of the glazing according to the invention are preferably made of soda-lime-silica glass. They are advantageously obtained by the float process. Nonetheless, other glass compositions are possible, for example compositions of borosilicate or aluminosilicate type.

The first and/or second glass sheet may be made of clear glass or tinted glass, preferably of tinted glass, for example tinted green, gray or blue. To this end, the chemical composition of the glass sheet in question advantageously comprises iron oxide, in a content by weight ranging from 0.5 to 2%. It may also comprise other coloring agents, such as cobalt oxide, chromium oxide, nickel oxide, erbium oxide or else selenium. In the preferred case of a motor vehicle windscreen, the light transmission of the glazing (illuminant A, CIE-1931 standard observer) is preferably at least 70%, or even 75%; at least one sheet then preferably comprises a content of iron oxide (expressed in the form $Fe_2O_3$) of between 0.5 and 0.9% by weight.

The first and/or the second glass sheet has a thickness of preferably between 0.7 and 5 mm, in particular between 1 and 4 mm, or even between 1.5 and 3 mm.

The lateral dimensions of each glass sheet should be adapted based on those of the laminated glazing with which it is intended to be integrated. The glazing preferably has a surface area of at least 1 $m^2$.

The first and/or the second glass sheet may be flat or bent. Each sheet is generally flat during the respective steps of depositing the paint composition and the enamel. The glass sheets are subsequently bent, generally together, before the lamination step, and therefore have a bent shape in the final glazing.

In an application as motor vehicle windscreen, the first glass sheet corresponds to the external sheet of the glazing, arranged on the convex side, and intended to be positioned outside the vehicle. The second glass sheet corresponds to the internal sheet, arranged on the concave side, and intended to be positioned inside the vehicle.

The region referred to as "first region" of the face 2 of the first glass sheet is coated with the layer of mineral paint. The layer of mineral paint coats the whole of the first region and is not deposited outside this first region.

The first region preferably represents between 2 and 25%, in particular between 3 and 20%, or even between 5 and 15%, of the surface area of the face 2. The first region is preferably in the form of a peripheral strip. "Peripheral strip" is intended to mean a strip which extends from the periphery of the glass sheet toward the inside of the glass sheet over a certain width, typically of between 1 and 30 cm. The peripheral strip is preferably closed in on itself, i.e. it occupies the whole of the periphery of the glass sheet.

The layer of mineral paint preferably creates a camera region, i.e. a region not coated with mineral paint forming a transmission window. This camera region is typically located in an upper central part of the glazing when in the usage situation, i.e. when mounted in the motor vehicle. The camera region is preferably thoroughly surrounded by the layer of mineral paint. The camera region preferably has a trapezoidal shape. The surface area of the camera region is preferably between 5 and 300 $cm^2$, in particular between 10 and 250 $cm^2$.

The uncoated region of the layer of mineral paint is generally uncoated (the glass is then naked). Alternatively, this region may be coated with a low-emissivity coating, in particular comprising at least one thin layer of silver, which makes it possible to improve the thermal comfort or to reduce consumption intended for heating or air-conditioning the passenger compartment, or else, when current supplies are provided, makes it possible to provide a heating function which is of use for example for defrosting or defogging the glazing. Such a coating is nonetheless preferentially provided on face 3 of the glazing.

The layer of mineral paint is preferably in direct contact with the first glass sheet.

The layer of opaque mineral paint is preferably black. In particular, the lightness $L^*$ measured in reflection on the glass side (i.e. on the side opposite the layer of mineral paint) is preferably less than 5, in particular less than 3. The measurement is performed for example by means of a spectrocolorimeter, and the calculation is performed taking into consideration the illuminant D65 and the CIE 1964 standard observer (10°).

The thickness of the layer of mineral paint is preferably between 2 and 20 µm, in particular between 3 and 15 µm, or even between 4 and 10 µm. Here, this is the thickness of the final layer, after curing.

The layer of mineral paint is obtained from an aqueous paint composition comprising pigments and an aqueous solution of alkali metal silicate.

At least one, in particular each, pigment is preferably based on an oxide or a sulfide of iron, chromium, copper, cobalt and/or manganese.

The aqueous solution of alkali metal silicate preferably comprises at least one sodium, potassium and/or lithium silicate. The aqueous solution of alkali metal silicate may consist of a mixture of different aqueous solutions of alkali metal silicates, for example a mixture of at least one aqueous solution of sodium and at least one aqueous solution of potassium.

The paint composition preferably comprises at least one mineral filler, in particular selected from colloidal silica, feldspars, alumina and lamellar fillers. The lamellar fillers are preferably selected from talc, mica and clays, in particular clays based on silicate or aluminosilicate such as kaolinite, illite, montmorillonite and sepiolite. The paint composition advantageously comprises a mixture of several of these mineral fillers.

The mineral fillers and the pigments preferably have a particle size distribution (by volume) such that the d90 thereof is less than 10 µm.

The paint composition may also comprise a base, in particular an alkali metal hydroxide.

The paint composition may further contain different additives, such as at least one dispersant, at least one antifoaming agent, at least one thickener, at least one stabilizer and/or at least one curing agent.

In the layer of mineral paint, the content by weight of alkali metal silicate is preferably between 7% and 60%, in particular between 15% and 55%. The total content by weight of pigments and mineral fillers is preferably between 20 and 90%, in particular between 30 and 70%. The total content of additives is preferably between 0.1 and 5%.

These contents also apply to the aqueous paint composition (this is then a percentage relative to the solids content).

The layer of mineral paint (after the pre-curing) therefore comprises alkali metal silicate and pigments, and where appropriate mineral fillers.

The layer of mineral paint is preferably deposited by screen printing. The step of depositing the paint composition is then carried out by screen printing. Screen printing comprises the deposition, in particular using a doctor blade, of a fluid composition onto the glass sheet through apertures of a screen. The apertures of the screen are blocked off in the part corresponding to the regions of the glass sheet that are not to be covered, so that the fluid composition can pass through the screen only in the regions to be printed, according to a pre-defined pattern. Other deposition techniques, such as digital printing techniques, are also possible.

The pre-curing step may be preceded by a drying step. However, this step is not generally necessary, since the water contained in the paint may evaporate during the pre-curing.

After deposition of the paint composition, the coated glass sheet undergoes a step of pre-curing, intended to cure the layer of paint before the bending step. Mineral paints based on alkali metal silicates can usually be cured at moderate temperatures of the order of 200 to 250° C. The pre-curing is preferably carried out at a temperature of at most 580° C., and even of at most 550° C., in order to prevent any optical distortion at the camera region.

The pre-curing step is typically carried out in a radiative furnace or a convection furnace. The pre-curing time is preferably between 60 and 1000 seconds, in particular between 100 and 600 seconds, or even between 120 and 500 seconds.

The face 4 (of the second glass sheet) is coated over a region, referred to as "second region", with an enamel coating. The enamel coating coats the whole of the second region and is not deposited outside this second region.

This second region is intended to receive, over at least one part thereof, the assembly seal of the glazing in the vehicle body window opening. This seal is generally in the form of a bead deposited at the periphery of the glazing, on the second region. In some cases, the second region may be wider than the assembly seal and thus be visible from inside the vehicle, forming for example a decoration.

It has been observed that the presence of enamel in this region made it possible to improve the mechanical strength and chemical resistance of the seal. On the other hand, a silicate paint, such as that deposited on face 2 of the glazing, would not make it possible to meet the requirements of car manufacturers.

The second region preferably represents between 1 and 15%, in particular between 2 and 10%, or even between 2 and 8%, of the surface area of the face 4. The second region is preferably in the form of a peripheral strip. "Peripheral strip" is intended to mean a strip which extends from the periphery of the second glass sheet toward the inside of the second glass sheet over a certain width, preferably of between 1 and 5 cm, in particular between 2 and 4 cm. The second region may occupy the whole periphery of the second glass sheet, or just a part, typically 50 to 80% of this periphery.

The second region is preferably facing at least a part of the first region.

The enamel coating is preferably deposited from a fluid enamel composition comprising a glass frit, pigments and an organic medium. The latter is eliminated during the bending step, which makes it possible to consolidate the enamel coating, or even where appropriate during a treatment for pre-curing the enamel. After curing, the enamel coating therefore comprises pigments in an essentially glass matrix.

The glass frit or the glass matrix is preferably based on a bismuth and/or zinc borosilicate. Bismuth borosilicates are preferred, since they have better resistance to acids.

The pigments preferably comprise one or more oxides selected from oxides of chromium, copper, iron, manganese, cobalt, nickel. These may be, by way of example, copper and/or iron chromates.

The thickness of the enamel coating, after the heat treatment step, is preferably within a range extending from 5 to 50 µm, in particular from 10 to 40 µm.

The enamel coating is preferably deposited by screen printing from a fluid enamel composition comprising a glass frit, pigments and an organic medium. To this end, the enamel composition is deposited, in particular using a doctor blade, onto the glass sheet through apertures of a screen. The apertures of the screen are blocked off in the part corresponding to the regions of the glass sheet that are not to be covered, so that the enamel composition can pass through the screen only in the regions to be printed, according to a pre-defined pattern.

Other deposition techniques such as digital printing techniques (for example inkjet printing or transfer printing under the effect of laser radiation) are also possible.

The deposition of the enamel coating may be followed by a pre-curing step. This treatment implements temperatures preferably of between 550 and 650° C., in particular between 560 and 600° C. The pre-curing treatment is in particular of use for developing the non-stick properties of certain enamels. Given the position of the enamel coating on face 4, such a pre-curing will not be necessary in most cases. The final curing of the enamel generally takes place during the bending step.

Before pre-curing, the enamel coating has a thickness preferably of between 10 and 30 µm, in particular between 15 and 25 µm. After curing, thus in the final glazing, the thickness of the enamel coating is preferably between 5 and 15 µm, in particular between 7 and 13 µm.

The enamel is preferably black, and advantageously has a colorimetric coordinate $L^*$, in reflection on the glass side, of less than 10, in particular less than 5, and even less than 3.

The laminated glazing is preferably bent. To this end, the two glass sheets are bent, generally together.

The bending may particularly be carried out for example by gravity (with the glass deforming under its own weight) or by pressing, at temperatures ranging typically from 550 to 650° C. In order to prevent the glass sheets from sticking to one another during the bending, the glass sheets are preferably held apart by arranging an interlayer powder therebetween, providing a space of a few tens of micrometers, typically from 20 to 50 µm. The interlayer powder is for example based on calcium and/or magnesium carbonate.

During the bending, the second glass sheet (intended to be positioned inside the passenger compartment) is normally placed above the first glass sheet. The face 4 is then located right at the top of the assembly, with the face 2 being in contact with the second glass sheet (optionally separated by the interlayer powder).

The step of lamination may be carried out by treatment in an autoclave, for example at temperatures from 110 to 160° C. and under a pressure ranging from 10 to 15 bar. Prior to the autoclave treatment, the air trapped between the glass sheets and the lamination interlayer can be eliminated by calendering or by applying negative pressure.

The second glass sheet is preferably the internal sheet of the laminated glazing, i.e. the sheet located on the concave side of the glazing, intended to be positioned inside the passenger compartment of the vehicle.

The lamination interlayer preferably comprises at least one sheet of polyvinyl acetal, particularly polyvinyl butyral (PVB).

The lamination interlayer can be tinted or untinted in order, if necessary, to regulate the optical or thermal properties of the glazing.

The lamination interlayer may advantageously have acoustic absorption properties in order to absorb airborne or structure-borne sounds. To this end, it may particularly consist of three polymeric sheets, including two "external" PVB sheets surrounding an internal polymeric sheet, optionally made of PVB, with a lower hardness than that of the outer sheets.

The lamination interlayer may also have thermal insulation properties, in particular properties of infrared radiation reflection. To this end, it may comprise a coating of thin layers with low-emissivity, for example a coating comprising a thin layer of silver or a coating alternating dielectric layers with different refractive indices, deposited on an internal PET sheet surrounded by two external PVB sheets.

The thickness of the lamination interlayer is generally within a range extending from 0.3 to 1.5 mm, particularly from 0.5 to 1 mm. The lamination interlayer can have a smaller thickness on an edge of the glazing than at the center of the glazing in order to prevent the formation of a double image in the case of using a head-up display (HUD).

Another subject of the invention is a motor vehicle windscreen comprising a glazing according to the invention. Preferably, the layer of mineral paint creates a camera region, i.e. a region not coated with mineral paint forming a transmission window. This camera region is typically located in an upper central part of the windscreen when in the usage situation, i.e. when mounted in the motor vehicle. It preferably has a trapezoidal shape. The surface area of the camera region is preferably between 5 and 300 $cm^2$, in particular between 10 and 250 $cm^2$. The windscreen then further comprises at least one sensor arranged facing said camera region. At least one sensor is for example a camera (in particular visible and/or infrared, in particular thermal) or a LiDAR.

The windscreen preferably comprises an assembly seal arranged in contact with the enamel coating. This seal is typically in the form of a bead arranged on at least a part of the periphery of the windscreen. The seal is typically based on polyurethane.

FIG. 1 and the examples which follow non limitingly illustrate the invention.

FIG. 1 is an exploded view of the two glass sheets of a nonlimiting example of laminated glazing according to the invention.

The first glass sheet 1 and the second glass sheet 2 are herein shown after bending and before lamination. After lamination, the assembly will form a motor vehicle windscreen. The face 1 of what will become the laminated glazing (face intended to be positioned outside the motor vehicle) is shown at the front of the first glass sheet 1. The face 2, denoted 12, is therefore the rear face of the first glass sheet 1, and after lamination will be in contact with the lamination interlayer, not shown.

The face 4, denoted 22, of what will become the laminated glazing (face intended to be positioned inside the motor vehicle) is also the rear face of the second glass sheet 2.

The face 2, denoted 12 in the FIGURE, is coated with a layer of opaque black mineral paint based on silicate in a first region 14. It has the form of a relatively narrow peripheral strip on the lateral edges, which is wider in the lower part, and also forms, in the upper central part, a region intended to conceal and protect the seal for attaching the interior rear-view mirror. The layer of mineral paint further forms an uncoated camera region 16 which is trapezoidal in shape.

The face 4, denoted 22 in the FIGURE, is coated with an enamel coating in a second region 24. It is in the form of a peripheral strip which occupies part of the periphery of the second glass sheet 2. The peripheral strip is thin, with dimensions based on the width of the seal which will be deposited on the enamel coating and will serve to attach the glazing to the vehicle body window opening. According to another example, the peripheral strip may be wider than the width of the seal and therefore be visible from inside the vehicle. The second region 24 is located facing the first region 14.

The layer of mineral paint and the enamel coating are visible here by transparency through the glass sheets 1 and 2 since they are deposited on the faces shown "behind" the glass sheets in the FIGURE.

Glazings as shown in the FIGURE were obtained in the manner described below.

A layer of black opaque mineral paint was deposited on a first clear glass sheet of a thickness of 2.1 mm. The layer was deposited by screen printing, using a screen having 77 threads/cm, a silicate composition sold under the reference Ceramiglass OPH-CG21-231 by ICD. The layer then underwent pre-curing at 560° C.

A coating of black enamel, sold under the reference 14305 by Ferro, was deposited by screen printing on a second clear glass sheet of a thickness of 2.1 mm.

The two glass sheets were then bent together by gravity, according to a known process, the second glass sheet being located above the first glass sheet.

In a comparative example C1, the layer of silicate paint on face 2 was replaced with a layer of enamel (reference JM 1L6026), deposited by screen printing using a screen having 90 threads/cm.

In a comparative test C2, the enamel coating on face 4 was replaced by a layer of silicate paint identical to that deposited on face 2.

The optical distortion (29.4°, filter 1/2/0) in the camera region in the case of the example according to the invention was 80 millidiopters. For the comparative example C1, it was 180 millidiopters.

The chemical resistance of the coating deposited on face 4 was evaluated by acid attack by means of a 0.1 N solution of sulfuric acid at 80° C. for durations ranging from 4 to 78 h. No discoloration was observed for the example according to the invention. On the other hand, significant discoloration was observed in the case of the comparative example C2 for attack durations of greater than 4 h.

The invention claimed is:

1. A bent laminated glazing comprising a first glass sheet adhesively bonded to a second glass sheet by a lamination interlayer, said first glass sheet comprising a face facing said lamination interlayer, and said second glass sheet comprising a face opposite said lamination interlayer, wherein said face of the first glass sheet comprises a first region, coated with a layer of opaque mineral paint obtained from an aqueous paint composition comprising pigments and an aqueous solution of alkali metal silicate, and said face of the second glass sheet comprises a second region, coated with an enamel coating, wherein said bent laminated glazing comprises an optical sensor transmission window that is formed only by the layer of opaque mineral paint.

2. The bent laminated glazing according to claim 1, wherein the layer of opaque mineral paint is black.

3. The bent laminated glazing according to claim 2, wherein a lightness L* measured in reflection on a glass side of the first glass sheet opposite the first region is less than 5.

4. The bent laminated glazing according to claim 1, wherein the first region represents between 2 and 25% of a surface area of the face of the first glass sheet.

5. The bent laminated glazing according to claim 4, wherein the first region represents between 3 and 20% of the surface area of the face of the first glass sheet.

6. The bent laminated glazing according to claim 1, wherein a thickness of the layer of mineral paint is between 2 and 20 μm.

7. The bent laminated glazing according to claim 6, wherein the thickness of the layer of mineral paint is between 3 and 15 μm.

8. The bent laminated glazing according to claim 1, wherein the second region represents between 1 and 15% of a surface area of the face of the second glass sheet.

9. The bent laminated glazing according to claim 8, wherein the second region represents between 2 and 10% of the surface area of the face of the second glass sheet.

10. The bent laminated glazing according to claim 1, wherein the second region is in the form of a peripheral strip.

11. The bent laminated glazing according to claim 1, wherein the second region is facing at least part of the first region.

12. The bent laminated glazing according to claim 1, wherein, in the layer of mineral paint, a content by weight of alkali metal silicate is between 7% and 60% and a total content by weight of pigments and mineral fillers is between 20 and 90%.

13. The bent laminated glazing according to claim 12, wherein, in the layer of mineral paint, the content by weight of alkali metal silicate is between 15% and 55% and the total content by weight of pigments and mineral fillers is between 30 and 70%.

14. The bent laminated glazing according to claim 1, wherein the bent laminated glazing is a motor vehicle windscreen.

15. The bent laminated glazing according to claim 1, wherein the layer of opaque mineral paint defines a periphery of the optical sensor transmission window.

16. The bent laminated glazing according to claim 15, wherein the layer of opaque mineral paint is in contact with the first glass sheet.

17. A motor vehicle windscreen comprising a glazing according to claim 1, wherein the layer of opaque mineral paint creates a camera region, said motor vehicle windscreen further comprising at least one sensor arranged facing said camera region and also an assembly seal arranged in contact with the enamel coating.

18. The motor vehicle windscreen according to claim 17, wherein the first glass sheet corresponds to an external sheet of the windscreen, arranged on a convex side and intended to be positioned outside the vehicle, and the second glass sheet corresponds to an internal sheet of the windscreen, arranged on a concave side and intended to be positioned inside the vehicle.

19. The motor vehicle windscreen according to claim 17, wherein a surface area of the camera region is between 5 and 300 $cm^2$.

20. A method for obtaining a laminated glazing according to claim 1, comprising:
  depositing on the first region, of the face of the first glass sheet, the aqueous paint composition comprising pigments and the aqueous solution of alkali metal silicate, then pre-curing at a temperature of at least 200° C., so as to obtain the layer of opaque mineral paint,
  depositing on the second region, of the face of the second glass sheet, the enamel coating, then
  bending the first and second glass sheet, then
  laminating the first and the second glass sheet by the lamination interlayer, such that said face of the first glass sheet is facing said interlayer and said face of the second glass sheet is opposite said interlayer.

21. The method according to claim 20, wherein the depositing of the aqueous paint composition is carried out by screen printing.

22. The method according to claim 20, wherein the pre-curing is carried out at a temperature of at most 580° C.

* * * * *